United States Patent [19]

Ringo

[11] Patent Number: 5,008,096

[45] Date of Patent: Apr. 16, 1991

[54] CATALYST ENHANCED GENERATION OF CHLORINE DIOXIDE

[75] Inventor: James P. Ringo, Norman, Okla.

[73] Assignee: Bio-Cide International, Inc., Norman, Okla.

[21] Appl. No.: 504,613

[22] Filed: Apr. 3, 1990

[51] Int. Cl.$^5$ .............................................. C01B 11/02
[52] U.S. Cl. .................................................... 423/477
[58] Field of Search ........................................ 423/477

[56] References Cited

U.S. PATENT DOCUMENTS

| | | | |
|---|---|---|---|
| 3,386,915 | 6/1968 | Rutschi et al. | 423/477 |
| 4,156,713 | 5/1979 | Fuller | 423/479 |
| 4,234,446 | 11/1980 | Ramras | 423/477 |
| 4,250,144 | 2/1981 | Ratigan | 423/477 |
| 4,303,625 | 12/1981 | Cull | 423/213.5 |
| 4,534,952 | 8/1985 | Rapson et al. | 423/477 |
| 4,770,868 | 9/1988 | Norell | 423/479 |

FOREIGN PATENT DOCUMENTS

| | | | |
|---|---|---|---|
| 65819 | 12/1982 | European Pat. Off. | 423/478 |
| 2504559 | 10/1982 | France | 423/477 |

Primary Examiner—Michael L. Lewis
Assistant Examiner—Brian M. Bolam
Attorney, Agent, or Firm—Bill D. McCarthy; Glen M. Burdick

[57] ABSTRACT

A method for enhancing generation of chlorine dioxide from an aqueous medium containing a chlorine dioxide precursor which comprises contacting the aqueous medium with a catalytic amount of a catalyst selected from the group consisting of a transition metal, a transition metal oxide and mixtures thereof for a period of time effective to generate chlorine dioxide. The transition metals and transition metal oxides which may be employed as the catalyst to enhance the generation of chlorine dioxide are the transition metals of Group 5B, 6B, 7B and 8 of the Periodic Table of Elements.

20 Claims, No Drawings

CATALYST ENHANCED GENERATION OF CHLORINE DIOXIDE

BACKGROUND OF THE INVENTION

1. Field of the Invention

The present invention relates to a method for generating chlorine dioxide from a stable precursor, and more particularly but not by way of limitation, to catalytically enhanced generation of chlorine dioxide from a chlorine dioxide precursor.

2. Brief Statement of the Prior Art

Chlorine dioxide has been found to act as a disinfecting or sterilizing agent for solutions and devices. Further, chlorine dioxide has been employed as a purification agent in the treatment of water, especially drinking water. When employing chlorine dioxide as a purification agent in large scale water treatment the chlorine dioxide is generally produced from sodium chlorite solutions which are subjected to chlorination, acidification, or a combination of chlorination and acidification.

The chlorination of sodium chlorite solutions is well known; and the chlorination of sodium chlorite solutions is represented by the general formula:

$$2NaClO_2 + Cl_2 \rightleftharpoons 2ClO_2 + 2NaCl$$

Acidification of sodium chlorite solutions in order to produce chlorine dioxide is also well known and is represented by the general formula:

$$5NaClO_2 + 4HCl \rightleftharpoons 4ClO_2 + 5NaCl + 2H_2O$$

While chlorine dioxide has heretofore been produced on a large scale for treatment of water by chlorination or acidification of sodium chlorite solutions, new and improved methods are constantly being sought which will enhance the generation of chlorine dioxide in order to assure that sufficient chlorine dioxide is present for the purification of the water, as well as to improve the economics of water purification when chlorine dioxide is employed as the purification agent. It is to such a method for enhancing generation of chlorine dioxide from an aqueous medium containing a chlorine dioxide precursor that the present invention is directed.

SUMMARY OF THE INVENTION

In accordance with the present invention a method for enhancing generation of chlorine dioxide is provided wherein an aqueous medium containing a chlorine dioxide precursor is contacted with a catalytic amount of selected transition metals and/or transition metal oxides for a period of time effective to enhance generation of chlorine dioxide. The transition metals and transition metal oxides which can be employed as the catalyst for enhancing the generation of chlorine dioxide are the transition metals and oxides thereof in Group 5B, 6B, 7B, and 8 of the Periodic Table of Elements, as well mixtures of such transition metals and transition metal oxides.

To further enhance the generation of chlorine dioxide from an aqueous medium containing a chlorine dioxide precursor, i.e. a compound capable of generating chlorine dioxide when contacted with a transition metal or transition metal oxide catalyst, the aqueous medium is maintained at a temperature of from about 5° C. to about 80° C. during contact with the catalyst; and the pH of the aqueous medium is adjusted to a pH within the range of from about 1 to about 8 by the addition of an effective amount of an acidic constituent.

An object of the present invention is to provide an improved method for generating chlorine dioxide.

Another object of the present invention, while achieving the before stated object, is to enhance generation of the chlorine dioxide from an aqueous solution containing a chlorine dioxide precursor.

Yet another object of the present invention, while achieving the before stated objects, is to enhance generation of chlorine dioxide from an aqueous solution of sodium chlorite.

Other objects, advantages and features of the present invention will become apparent on reading of the following detailed description in conjunction with the appended claims.

DETAILED DESCRIPTION

The present invention provides a method for enhancing generation of chlorine dioxide from an aqueous medium containing a chlorine dioxide precursor, also referred to herein as a compound capable of generating chlorine dioxide.

Broadly, the method for enhancing generation of chlorine dioxide comprises contacting an aqueous medium containing a chlorine dioxide precursor with a catalytic amount of at least one appropriate transition metal or transition metal oxide for a period of time effective to generate chlorine dioxide. The temperature at which the aqueous medium is maintained during contact of the chlorine dioxide precursor with the transition metal or transition metal oxide catalyst can vary widely, the major criteria being that the aqueous mixture is maintained in its liquid state. However, it is believed that the efficiency of the generation of chlorine dioxide from the aqueous solution containing the chlorine dioxide precursor, such as sodium chlorite, can be enhanced when the aqueous mixture is maintained at a temperature of from about 5° C. to about 80° C. during contact of the chlorine dioxide precursor with the transition metal or transition metal oxide catalyst.

In order to further enhance the generation of chlorine dioxide the pH of the aqueous solution can be adjusted to a pH within the range of from about 1 to about 8, and more desirably from about 1 to about 4. Any suitable acid can be employed to adjust the pH of the aqueous medium which does not adversely effect the chlorine dioxide generation, or produce undesirable side reactions with either the catalyst or the chlorine dioxide precursor. That is, the acidic constituent employed to adjust the pH of the aqueous solution can be any suitable organic or inorganic acid which is compatible with the aqueous solution, the chlorine dioxide precursor and chlorine dioxide. However, it should be understood that when employing an organic acid to adjust the pH of the aqueous medium the organic acid must also have a pKa value sufficient to lower the pH of the aqueous solution to the desired level.

Any suitable organic acid satisfying the before stated requirements can be employed to adjust the pH of the aqueous solution. Examples of such organic acids are acetic acid, oxalic acid, citric acid, lactic acid, and the like. Similarly, any suitable inorganic acid satisfying the before stated requirements can be employed as the acidic constituent to adjust the pH of the aqueous solution. Examples of such inorganic acids are hydrochloric acid, sulfuric acid, phosphoric acid and the like.

Chlorine dioxide precursors which may be employed in the practice of the present invention are those compounds capable of generating, releasing or being converted to chlorine dioxide when contacted with a transition metal or transition metal oxide catalyst under the reaction conditions herein before described. Generally, such chlorine dioxide precursors will produce chlorine dioxide in response to increased acidity. Thus, when employing chlorine dioxide precursors in the practice of the present invention the rate of production of chlorine dioxide of the these compounds can be increased when the pH level of the aqueous medium containing such chlorine dioxide precursors is maintained in a range from about 1 to about 8 and more desirably from about 1 to about 4.

Examples of suitable chlorine dioxide precursors satisfying the above definition are stabilized chlorine dioxide complexes and metal chlorite salts. The term "stabilized chlorine dioxide complexes" as used herein means, for example, one or more chlorine dioxide-containing complexes disclosed in U.S. Pat. Nos. 4,696,811 and 4,689,215, each of which is incorporated herein by reference. Among the most desirable stabilized chlorine dioxide complexes are carbonate and bicarbonate complexes. The exact chemical composition of many of these stabilized chlorine dioxide precursors is not completely understood. The manufacture or production of certain chlorine dioxide precursors is described in McNicholas, U.S. Pat. No. 3,278,447, which is hereby incorporated in its entirety by reference. An especially useful stabilized chlorine dioxide complex is a product sold by Bio-Cide International, Inc. of Norman, Oklahoma under the trademark Purogene ®.

As previously stated, the chlorine dioxide precursor employed in the practice of the present invention can also be a metal chlorite salt which, upon chlorination or acidification, produces chlorine dioxide. Any suitable metal chlorite salt capable of producing chlorine dioxide can be employed as the chlorine dioxide precursor in the practice of the present invention. However, desirable results have been obtained when the metal chlorite salt is an alkali metal chlorite, such as sodium chlorite.

The amount of chlorine dioxide precursor present in the aqueous medium can vary widely and will be dependent, to a large degree, upon the amount of chlorine dioxide to be generated. For example, when employing sodium chlorite as the chlorine dioxide precursor the amount of sodium chlorite can vary widely from the amount required to produce a dilute aqueous solution to a super saturated solution. On the other hand, when employing other chlorine dioxide precursors the amount of such precursor present in the aqueous medium can be varied so that the concentration of the precursor will provide a predetermined amount of chlorine dioxide under the desired reaction conditions.

In the generation of chlorine dioxide wherein sodium chlorite is employed as the chlorine dioxide precursor (and an aqueous medium containing the sodium chlorite is subjected to chlorination techniques) the amount of gaseous chlorine introduced into the aqueous medium can vary widely, but will generally be introduced in an amount sufficient to provide from about 0.5 mole to about 2 moles of chlorine per mole of sodium chlorite. The generation of chlorine dioxide using chlorination techniques can be further enhanced (that is, the rate/amount of chlorine dioxide generated under similar processing conditions can be increased) when the chlorination reaction is carried out in the presence of a transition metal or transition metal oxide catalyst under the conditions herein before set forth.

In generating chlorine dioxide from sodium chlorite using acidification techniques, an effective amount of hydrochloric acid is introduced into the aqueous medium to react with the sodium chlorite and effect generation of chlorine dioxide. Sodium hypochlorite can also be admixed into the aqueous sodium chlorite solution as an additional chlorine source; or the sodium hypochlorite can be used as the primary chlorine source to effect chlorination of the sodium chlorite. As will be appreciated, when employing sodium hypochlorite in combination with hydrochloric acid in the acidification of sodium chlorite, the amount of hydrochloric acid required to effect generation of chlorine dioxide from the sodium chlorite will be reduced because of the presence of the sodium hypochlorite.

The generation of chlorine dioxide using the before mentioned acidification procedures can further be enhanced when the acidification process is carried out in the presence of a catalytic amount of a transition metal or transition metal oxide catalyst under the conditions hereinbefore set forth. That is, the amount of chlorine dioxide generated from the sodium chlorite present in the aqueous medium can be increased when the acidification of the sodium chlorite is carried out in the presence of selected transition metal and transition metal oxide catalysts.

The transition metals and transition metal oxides which can be employed as a catalyst to enhance generation of chlorine dioxide from an aqueous medium containing a chlorine dioxide precursor are the transition metals selected from Group 5B, Group 6B, Group 7B, and Group 8 of the Periodic Table of Elements, including oxides of such transition metals and mixtures thereof. While any of the above specified transition metals or transition metal oxides can be employed as the catalyst for enhancing generation of chlorine dioxide in accordance with the present invention, the Group 6B transition metals and their oxides, such as vanadium and vanadium oxide or the Group 8 transition metals and their oxides, have been found to be particularly useful because of their high degree of effectiveness. Examples of the Group 8 transition metals and transition metal oxides which can be employed as the catalyst for the enhanced generation of chlorine dioxide are generally known as the platinum group of metals, oxides and mixtures thereof and include platinum, platinum oxide, palladium, palladium oxide, iridium, ruthenium, ruthenium oxide, rhodium and osmium.

The transition metals, transition metal oxides and mixtures thereof which can be used in the practice of the present invention may be in metallic form and/or in a combined form as part of an organic or inorganic compound or complex. The catalytic amount of the transition metal, transition metal oxide, or mixture thereof employed as the catalytic compound in the practice of the invention can vary widely and is to be viewed in terms of what quantity or surface area is useful to generate a particular concentration of chlorine dioxide in a given time and in light of the amount of the chlorine dioxide precursor present in the aqueous solution. Because the transition metal catalyst and/or oxide thereof is not consumed during the enhanced generation of chlorine dioxide it must be assumed that the transition metal and/or transition metal oxide functions as a catalyst. However, the chemistry of the catalytic enhancement of the generation of chlorine dioxide using the transition metal catalyst and/or transition metal oxide catalyst has not been investigated other than to observe that such is not consumed in the process of enhancing the generation of chlorine dioxide, whether same is accomplished using chlorination techniques, acidification techniques, or by contacting the aqueous medium containing a chlorine dioxide precursor with the transition metal catalyst and/or transition metal oxide catalyst.

Because the method for enhancing generation of chlorine dioxide from a chlorine dioxide precursor appears catalytic in nature, the amount of metal or metal oxide surface area exposed to the solution should be taken into consideration in order to optimize the enhanced generation of chlorine dioxide. Specific surface area data can be readily determined by simply exposing a chlorine dioxide precursor, such as a chlorite salt, of a predetermined concentration to various transition metals and transition metal oxides deposited on different surface areas, and thereafter observing the rate of chlorine dioxide formation. By using such a procedure the actual parameters desirable for the catalyst constituent can be determined.

It often desirable to plate the transition metal and/or transition metal oxides on a support matrix or device. Such supports are particularly useful if the transition metal and/or transition metal oxide is a Group 8 transition metal or oxide thereof (i.e., the platinum group metals) because transition metals are often quite expensive. Further, the support may be chosen so as to provide surface area on which promotion components can also be placed.

Any suitable support material may be employed as the support or matrix for the transition metal or transition metal oxide catalyst, provided that such support material is substantially inert when exposed to the conditions used in the enhanced generation of chlorine dioxide from a chlorine dioxide precursor in accordance with the present invention. Examples of support materials which may be employed as an inert matrix for the catalyst constituent include polymeric materials (plastics), metals, aluminas, silicas, clays, ceramics, and the like. The supported promotion component may have any suitable shape or configuration, such as sheets, rods, extrudates, tablets, pills, irregular shaped particles, spheres, disks and the like. Any of a number of conventional techniques can be employed to deposit the transition metal and/or transition metal oxide on the support material. These techniques include impregnation, coprecipitation, ion-exchange, dipping, spraying, vacuum deposits and the like.

The amount of catalyst employed to achieve the catalytically enhanced generation of chlorine dioxide from an aqueous medium containing a chlorine dioxide precursor can vary widely and will depend, to a large extent, upon the surface area of the catalytic constituent. Generally, however, the catalytic amount of the transition metal and/or transition metal oxide employed in the catalytically enhanced generation of chlorine dioxide from a chlorine dioxide precursor in accordance with the present invention is an amount of from about 0.001 to about 5 weight percent of the transition metal or transition metal oxide, based on the weight of the chlorine dioxide precursor present in the aqueous medium.

The time in which the aqueous medium is maintained in contact with the transition metal or transition metal oxide catalyst so as to enhance generation of chlorine dioxide from the chlorine dioxide precursor can also vary widely and will be dependent, to a large degree, upon the temperature of the aqueous solution containing the chlorine dioxide precursor. For example, the contact time required between the catalyst and a chlorine dioxide precursor, such as sodium chlorite, in order to enhance generation of chlorine dioxide is at least about 5 seconds, and more desirably at least about 20 seconds, when the aqueous medium has a temperature in the range of from about 5° C. to about 80° C.

In order to enhance the generation of chlorine dioxide it is often desirable that the reaction liquor (i.e., the aqueous solution containing the chlorine dioxide precursor and the catalyst) be agitated or stirred during the acidification or chlorination of the chlorine dioxide precursor. As can be appreciated, agitation of the reaction liquor insures improved contact between the catalyst and the chlorine dioxide precursor. Agitation or stirring of aqueous mediums is well known in the art. Thus, no further description of the agitation or stirring of the reaction liquor to improve contact between the transition metal and/or transition metal oxide catalyst and the chlorine dioxide precursor is believed necessary to permit one skilled in the art to fully understand and practice the present invention.

In order to more fully describe the present invention the following examples are set forth. However, it is to be understood that the examples are for illustrative purposes only and are not to be construed as limiting the scope of the present invention as defined in the appended claims.

EXAMPLE 1

A reaction liquor containing 10.20 grams of 25.0% sodium chlorite solution ($NaClO_2$) was reacted with 20.80 grams of 5.25% sodium hypochlorite solution (NaOCl), and 2.76, grams of 31.45% HCl. The reaction was allowed to proceed for forty (40) seconds under vigorous agitation and then the reaction was quenched by diluting the reaction liquor in 2450 mls of ice water. The reaction was conducted in the absence of platinum catalyst at 25° C. and in the presence of platinum catalyst at 25° C. and 45° C. The quenched reaction liquor was tested for residual available chlorine dioxide and concentration of available chlorine dioxide in the reaction liquor at 40 seconds was calculated.

| Test Conditions | Results: Residual Available [$ClO_2$] |
|---|---|
| No Catalyst 25° C. - 40 sec. | 27,062 ppm |
| Pt Catalyst 25° C. - 40 sec. | 13,030 ppm |
| Pt Catalyst 45° C. - 40 sec. | 16,638 ppm |

EXAMPLE 2

A reaction liquor containing 7.28 grams of 35% sodium chlorite solution ($NaClO_2$) was reacted with 20.8 grams of 5.25% sodium hypochlorite solution (NaOCl), and 2.76 grams of 31.45% HCl. The reaction was allowed to proceed under vigorous agitation for forty (40) seconds and then the reaction was quenched by diluting the reaction liquor in 2450 mls of ice water. The reaction was conducted in the absence of platinum catalyst at 25° C. and in the presence of platinum catalyst at 25° C. and 45° C. The quenched reaction liquor was tested for residual available chlorine dioxide and from this the concentration of available chlorine dioxide in the reaction liquor at 40 seconds was calculated.

| Test Conditions | Results: Residual Available [ClO$_2$] |
| --- | --- |
| No Catalyst 25° C. - 40 sec. | 30,251 ppm |
| Pt Catalyst 25° C. - 40 sec. | 10,960 ppm |
| Pt Catalyst 45° C. - 40 sec. | 20,387 ppm |

EXAMPLE 3

The procedure used in Example 2 was repeated to determine if the results were experimentally repeatable. The results are given below.

| Test Conditions | Results: Residual Available [ClO$_2$] |
| --- | --- |
| No Catalyst 25° C. - 40 sec. | 36,170 ppm |
| Pt Catalyst 25° C. - 40 sec. | 12,056 ppm |
| Pt Catalyst 45° C. - 40 sec. | 20,825 ppm |

EXAMPLE 4

A reaction liquor containing 7.28 grams of 35% sodium chlorite solution (NaClO$_2$) was reacted with 20.8 grams of 5.25% sodium hypochlorite solution (NaOCl), and 2.76 grams of 31.45% HCl. The reaction was allowed to proceed under vigorous agitation for sixty (60) seconds and then the reaction was quenched by diluting the reaction liquor in 2450 mls of ice water. The reaction was conducted in the absence of platinum catalyst at 25° C. and in the presence of platinum catalyst at 25° C. and 45° C. The quenched reaction liquor was tested for residual available chlorine dioxide and from this the concentration of available chlorine dioxide in the reaction liquor at 60 seconds was calculated.

| Test Conditions | Results: Residual Available [ClO$_2$] |
| --- | --- |
| No Catalyst 25° C. - 60 sec. | 35,100 ppm |
| Pt Catalyst 25° C. - 60 sec. | 5,480 ppm |
| Pt Catalyst 45° C. - 60 sec. | 19,729 ppm |

Discussion of Results of Examples 1-4

The concentration of residual available chlorine dioxide remaining in the reaction liquor at the time of quenching is indicative of the amount of chlorine dioxide gas generated and thus the reactive rate of chlorine dioxide gas generation. In all cases, it is apparent that the rate of chlorine dioxide generation was increased by the presence of the platinum catalyst over control which did not have the catalyst present.

The relative rate of chlorine dioxide generation was increased at the 35% sodium chlorite concentration over the 25% sodium chlorite concentration. Likewise, the 60 second reaction time resulted in lower residual of available ClO$_2$ for the 35% sodium chlorite solution at 25° C. The increase in temperature to 45° C. did not increase the apparent rate of ClO$_2$ generation over that observed at 25° C. However, the catalyzed reactions at 45° C. were faster than similar uncatalyzed reactions.

EXAMPLE 5

A reaction liquor containing 10.20 grams of 25.0% sodium chlorite solution (NaClO$_2$) was reacted with 20.80 grams of 5.25% sodium hypochlorite (NaOCl) and 2.76 grams of 31.45% hydrochloric acid. The reaction was conducted in both the presence and absence of platinum metal oxide catalyst at 0° C. and 60° C. respectively. The reaction was allowed to proceed for forty (40) seconds under vigorous agitation and then the reaction was quenched by diluting the reaction liquor in 2450 mls of ice water. The quenched reaction liquor was assayed for residual available chlorine dioxide and the concentration of available chlorine dioxide in the reaction liquor at 40 seconds was calculated.

| Test Conditions | Results: Residual Available [ClO$_2$] |
| --- | --- |
| No Catalyst 0° C. - 40 sec. | 53,960 ppm |
| Pt Catalyst 0° C. - 40 sec. | 22,660 ppm |
| No Catalyst 60° C. - 40 sec. | 29,680 ppm |
| Pt Catalyst 60° C. - 40 sec. | 19,970 ppm |

The results indicate reduced catalytic activity occurs at the higher temperature of 60° C. The catalytic activity is observed to decrease with increasing temperature in the following manner —25° C.>45° C.>60° C. The lowest activity was observed at 0° C. and the greatest activity is at 25° C., for the temperatures tested. The catalyzed results are summarized as:

| Temperature | Residual Available [ClO$_2$] |
| --- | --- |
| 0° C. | 22,660 ppm |
| 25° C. | 13,030 ppm |
| 45° C. | 16,640 ppm |
| 60° C. | 19,970 ppm |

The uncatalyzed results are summarized as follows:

| Temperature | Residual Available [ClO$_2$] |
| --- | --- |
| 0° C. | 53,960 ppm |
| 25° C. | 27,060 ppm |
| 60° C. | 29,680 ppm |

EXAMPLE 6

Samples of various transition metals were obtained from the Aldrich Chemical Co. Transition metals in Groups 1B-8 were all represented by at least one member. The forms chosen were those which were easiest to use, cheapest and most likely to offer the largest surface area in order to maximize catalytic activity. The transition metals tested are as follows:

| Group | Element | Purity | Form |
| --- | --- | --- | --- |
| 1B | Silver | 99.9% | Silver Wool |
| 2B | Zinc | 99.9+% | Granular 20 mesh |
| 3B | Yttrium | 99.9% | Powder 40 mesh |
| 4B | Zirconium | 99.9+% | Foil |
| 5B | Vanadium | 99.7% | Chips |
| 6B | Chromium | 99.5% | Chips |
|  | Molybdenum | 99+% | Powder 100 mesh |
| 7B | Rhenium | 0.5% | On ⅛" Alumina pellets |
| 8 | Platinum | 0.5% | On ⅛" Alumina pellets |
|  | Rhodium | 0.5% | On ⅛" Alumina pellets |
|  | Ruthenium | 0.5% | On ⅛" Alumina pellets |

A 2.0 liter volume of a stabilized chlorine dioxide having 2% available chlorine dioxide sold by Bio-Cide International, Inc. under the trademark Purogene ® was adjusted to pH 7.5 by the addition of HCl. The solution was then purged of residual free chlorine dioxide by the addition of 2.0 mls of 35% hydrogen peroxide ($H_2O_2$). One hundred ml aliquots of the adjusted Purogene ® solution were transferred to 125 ml Erlenmeyer flasks and a catalyst from the list of the before mentioned transition metals was added to each flask. A control flask of the Purogene ® with no metal added was also prepared.

The test samples were maintained at an ambient room temperature of 22° C., and each test sample was observed for obvious signs of $ClO_2$ formation, such as the appearance of a yellow-green color. Samples which exhibited the characteristic color formation were quantitatively assayed for the presence of free chlorine dioxide with a spectrophotometer wherein aliquots of the test solutions were extracted, diluted if necessary, and the absorbance at 360 nm was measured using a Bausch & Lomb Spectronic 20 spectrophotometer blanked against an aliquot of the control sample. The observed absorbance reading was then converted to the equivalent free chlorine dioxide concentration using the formula:

$$A_{360} \times 57.41 = \text{free } [ClO_2] \text{ ppm}$$

The conversion factor of 57.41 had been previously calculated from the published molar extinction coefficients for chlorine dioxide.

As appropriate the samples were assayed at 20 minutes, one hour, and 24 hours. The results obtained are set forth as follows:

| Group/ Metal | | Approximate Amount | Free [ClO₂] 20 minutes | Free [ClO₂] 1 hour | Free [ClO₂] 24 hours |
|---|---|---|---|---|---|
| 1B | Silver | 1.0 g | — | 0 | 0 |
| 2B | Zinc | 20.0 g | — | 0 | 0 |
| 3B | Yttrium | 1.0 g | — | 0 | 0 |
| 4B | Zirconium | 100 mg | — | 0 | 0 |
| 5B | Vanadium | 25 g | 291 ppm | 1148 ppm | — |
| 6B | Chromium | 20 g | — | 0 | 2.9 ppm |
| 6B | Molybdenum | 2.5 g | — | 0 | 0 |
| 7B | Rhenium | 5.0 g | 0 | 0.6 ppm | 1.2 ppm |
| 8 | Platinum Oxide | 5.0 g | 2.3 ppm | 36 ppm | — |
| 8 | Rhodium | 5.0 g | 0 | 0.6 ppm | 9.3 ppm |
| 8 | Ruthenium | 5.0 g | 83 ppm | 94 ppm | — |

Vanadium (5B) generated tremendous qualities of free $ClO_2$. The actual $ClO_2$ generated was in excess of the reported quantities due to "gassing off". The generation of free $ClO_2$ by vanadium is particularly unexpected since the metal was in chip form and had a very small surface area relative to the weight used.

The Group 8 metals also evidenced desired catalytic activity. Other metals such as rhenium (7B) and chromium (6B) appeared to generate lesser amounts of $ClO_2$ at twenty-four hours.

As shown from the data of Examples 1-5, the presence of selected transition metal and/or transition metal oxides significantly enhances the rate of chlorine dioxide generation from a sodium chlorite solution when compared to a similar solution conducted at the same reaction conditions but in the absence of the transition metal and/or transition metal oxide. Further, Example 6 illustrates that transition metals and transition metal oxides of Groups 5B, 6B, 7B and 8 exhibit the desired catalytic properties for use in the enhanced generation of chlorine dioxide from an aqueous medium containing a chlorine dioxide precursor, whereas transition metals of Groups 1B, 2B, 3B, and 4B did not exhibit such catalytic activity.

It is clear that the present invention is well adapted to carry out the objects and obtain the ends and advantages mentioned therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A method for enhancing generation of chlorine dioxide from an aqueous medium containing sodium chlorite comprising:
    contacting the sodium chlorite present in the aqueous medium with an amount of gaseous chlorine effective to react with the sodium chlorite in the presence of a catalytic amount of a catalyst selected from the group consisting of an elemental transition metal, a transition metal oxide and mixtures thereof for a period of time effective to generate chlorine dioxide, the transition metal selected from Group 5B, 6B, 7B, 8 and mixtures thereof.

2. The method for enhancing generation of chlorine dioxide of claim 1 further comprising:
    maintaining the aqueous medium at a temperature of from about 5° C. to about 80° C. during contact of the sodium chlorite and the gaseous chlorine with the catalyst.

3. The method for enhancing generation of chlorine dioxide of claim 1 wherein the catalyst is a supported catalyst having an inert matrix.

4. The method of enhancing generation of chlorine dioxide of claim 1 further comprising admixing a minor effective amount of an acidic constitute to the aqueous medium to provide the aqueous medium with a pH in the range of from about 1 to about 8.

5. The method for enhancing generation of chlorine dioxide of claim 1 wherein the catalytic amount of catalyst contacted with the aqueous medium is an amount of from about 0.001 to about 5 weight percent based on the weight of the sodium chlorite present in the aqueous medium.

6. The method for enhancing generation of chlorine dioxide of claim 1 wherein the amount of gaseous chlorine effective to react with the sodium chlorite is from about 0.5 mole to about 2 moles of gaseous chlorine per mole of sodium chlorite and wherein the method further comprises stirring the aqueous medium during introduction of the gaseous chlorine to enhance contact between the sodium chlorite, the gaseous chlorine and the catalyst.

7. A method for enhancing generation of chlorine dioxide from an aqueous medium containing sodium chlorite comprising:
    contacting the sodium chlorite present in the aqueous medium with an amount of hydrochloric acid effective to react with the sodium chlorite in the presence of a catalytic amount of a catalyst selected from the group consisting of an elemental transition metal, a transition metal oxide and mixtures thereof for a period of time effective to generate chlorine dioxide, the transition metal selected from Groups 5B, 6B, 7B, and 8 and mixtures thereof.

8. The method for enhancing generation of chlorine dioxide of claim 7 further comprising:
maintaining the aqueous medium at a temperature of from about 5° C. to about 80° C. during contact of the sodium chlorite and the hydrochloric acid with the catalyst.

9. The method for enhancing generation of chlorine dioxide of claim 8 further comprising:
stirring the aqueous medium to enhance contact between the sodium chlorite, the hydrochloric acid and the catalyst.

10. The method for enhancing generation of chlorine dioxide of claim 7 wherein the catalyst is a supported catalyst having an inert matrix.

11. The method for enhancing generation of chlorine dioxide of claim 7 further comprising:
admixing a minor effective amount of an acidic constituent into the aqueous medium to provide the aqueous medium with a pH in the range of from about 1 to about 8.

12. The method for enhancing generation of chlorine dioxide of claim 7 wherein the catalytic amount of catalyst is from about 0.001 to about 5 weight percent, based on the weight of the sodium chlorite present in the aqueous medium.

13. The method for enhancing generation of chlorine dioxide of claim 7 further comprising stirring the aqueous medium to enhance contact between the sodium chlorite, the hydrochloric acid and the catalyst.

14. A method for enhancing generation of chlorine dioxide from an aqueous medium containing sodium chlorite comprising:
contacting the sodium chlorite present in the aqueous medium with an amount of sodium hypochlorite effective to react with the sodium chlorite in the presence of a catalytic amount of a catalyst selected from the group consisting of an elemental transition metal, a transition metal oxide and mixtures thereof for a period of time effective to generate chlorine dioxide, the transition metal selected from Groups 5B, 6B, 7B, 8 and mixtures thereof.

15. The method for enhancing generation of chlorine dioxide of claim 14 further comprising:
maintaining the aqueous medium at a temperature of from about 5° C. to about 80° C. during contact of the sodium chlorite and the sodium hypochlorite with the catalyst.

16. The method for enhancing generation of chlorine dioxide of claim 14 further comprising stirring the aqueous medium to enhance contact between the sodium chlorite, the sodium hypochlorite and the catalyst.

17. The method for enhancing generation of chlorine dioxide of claim 14 wherein the catalyst is a supported catalyst having an inert matrix.

18. The method for enhancing generation of chlorine dioxide of claim 14 further comprising admixing a minor effective amount of an acidic constitute into the aqueous medium to provide the aqueous medium with a pH in the range of about 1 to about 8.

19. The method for enhancing generation of chlorine dioxide of claim 14 wherein the catalytic amount of catalyst is from about 0.001 to about 5 weight percent, based on the weight of the sodium chlorite present in the aqueous medium.

20. The method for enhancing generation of chlorine dioxide of claim 14 wherein the amount of sodium hypochlorite effective to react with the sodium chlorite is an amount of from about 150 weight to about 250 weight percent based on the weight of the sodium chlorite.

* * * * *